US009330123B2

(12) United States Patent
Heller et al.

(10) Patent No.: US 9,330,123 B2
(45) Date of Patent: May 3, 2016

(54) METHOD AND SYSTEM FOR IMPROVING INFORMATION SYSTEM PERFORMANCE BASED ON USAGE PATTERNS

(75) Inventors: Jonathan Heller, Nirit (IL); Werner Aigner, Willmering (IL)

(73) Assignee: SAP SE, Walldorf (DE)

( * ) Notice: Subject to any disclaimer, the term of this patent is extended or adjusted under 35 U.S.C. 154(b) by 1140 days.

(21) Appl. No.: 12/642,817

(22) Filed: Dec. 20, 2009

(65) Prior Publication Data

US 2011/0153591 A1    Jun. 23, 2011

(51) Int. Cl.
*G06F 17/30* (2006.01)

(52) U.S. Cl.
CPC .... *G06F 17/30312* (2013.01); *G06F 17/30702* (2013.01); *G06F 17/30867* (2013.01)

(58) Field of Classification Search
CPC ............... G06F 17/30312; G06F 17/30702; G06F 17/30867
USPC ........................................................ 707/732
See application file for complete search history.

(56) References Cited

U.S. PATENT DOCUMENTS

| | | | | |
|---|---|---|---|---|
| 7,113,917 | B2 * | 9/2006 | Jacobi et al. | 705/14.53 |
| 8,260,774 | B1 * | 9/2012 | Aggarwal | 707/723 |
| 2001/0021914 | A1 * | 9/2001 | Jacobi et al. | 705/8 |
| 2001/0047358 | A1 | 11/2001 | Flinn | |
| 2002/0010706 | A1 | 1/2002 | Brickell | |
| 2004/0260680 | A1 * | 12/2004 | Best et al. | 707/3 |
| 2006/0107219 | A1 * | 5/2006 | Ahya et al. | 715/745 |
| 2008/0276277 | A1 * | 11/2008 | Ahn et al. | 725/40 |
| 2010/0031335 | A1 * | 2/2010 | Handler | 726/8 |
| 2010/0180127 | A1 * | 7/2010 | Li et al. | 713/186 |
| 2011/0119627 | A1 * | 5/2011 | Cho et al. | 715/811 |
| 2011/0153591 | A1 * | 6/2011 | Heller et al. | 707/713 |

FOREIGN PATENT DOCUMENTS

WO    99/50762    10/1999

* cited by examiner

*Primary Examiner* — James Trujillo
*Assistant Examiner* — Kurt Mueller

(57) ABSTRACT

Usage patterns of structure model are utilized to determine a personalized structure model associated with a user. The personalized structure model is constructed such that retrieval of data associated with the personalized structure model is expected to improve performance of retrieving data from the data provider. The personalized structure model may be arranged based on an order of retrieval, based on groups of structure objects that may be retrieved together or the like. The personalized structure model may be a flat structure model to further improve performance of retrieving data from the data provider.

22 Claims, 4 Drawing Sheets

METHOD AND SYSTEM FOR IMPROVING INFORMATION SYSTEM PERFORMANCE BASED ON USAGE PATTERNS

FIELD OF THE INVENTION

The present disclosure relates to retrieval of data from computer systems in general and to optimization of the retrieval, in particular.

BACKGROUND

It is common to have a user interface or an access point to an information system that comprises a data provider in order to retrieve data. The data provider may be for example, a database, another information system or the like. A user may approach the information system with a query associated to an entity represented by a structure model defined by the data provider. The information system retrieves the data from the data provider and provides the data to the user. The query may be in a query language, such as for example, Structured Query Language (SQL). Object Query Language (OQL), XQuery, Common Query Language (CQL), Representational State Transfer (REST), or Simple Object Access Protocol (SOAP) or the like.

In some cases, a user may query for a portion of data associated with an entity that is stored in the data provider. A plurality of fields of the entity may not be of interest to the user.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

There is a need that to enable a user to perform queries and retrieve data based on a personalized structure model, instead of the structure model of the data provider. Structure models of the data provider are generally not under the control of the information system. The data provider may have an inflexible frame which is not adapted to the information system and the needs of a specific user. Therefore the straight forward approach of retrieving data from the data provider, storing it in the information system memory and providing it to the user may be inefficient.

Retrieval of un-adapted structure models may consume computing resources such as memory, CPU, network bandwidth, system calls and the like. The resource consumption may not be optimized for the actual usage and, as a result, the resource consumption may increase the load on the computer system, may require unnecessary resources, may take longer time periods, and may cause performances issues.

Figure 1:
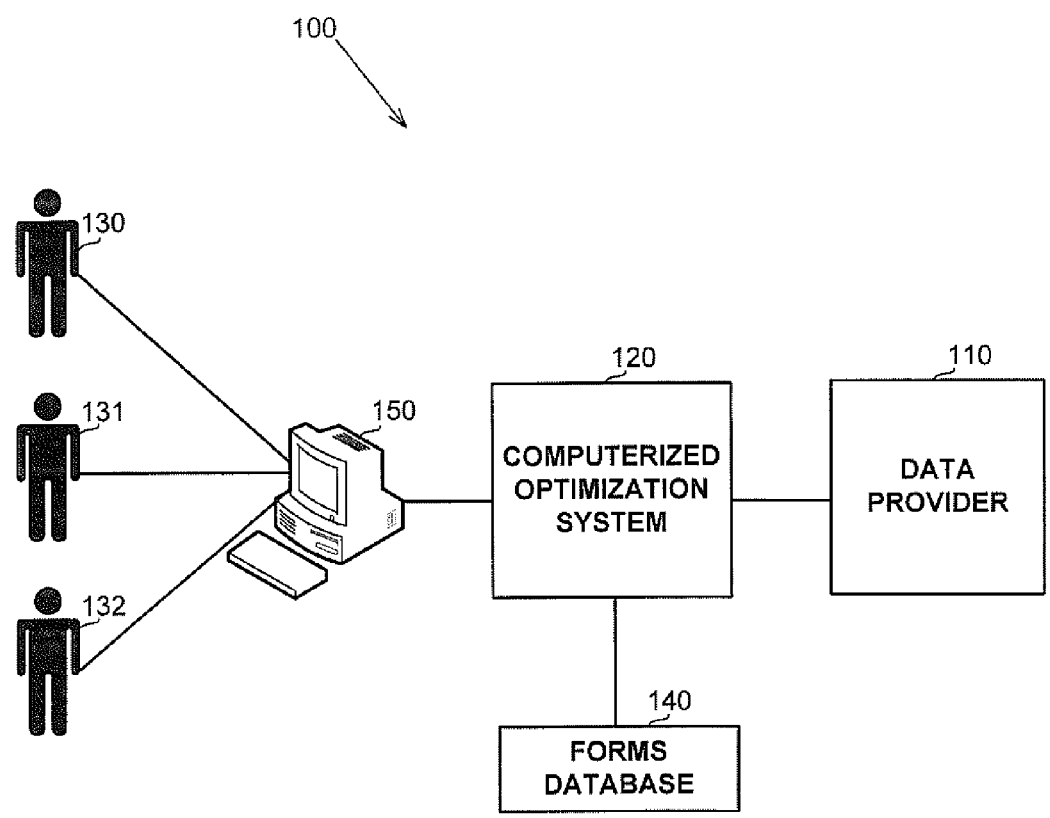
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 may comprise a data provider 110, a computerized optimization system 120, a forms database 140, a client layer 150 and a user 130.

The data provider 110 may be an Enterprise Resource Planning (ERP) system, an office automation system, an enterprise system or any other information system comprising a structure model associated with an entity. In some exemplary embodiments, there may be a plurality of data providers, such as 110. The computerized optimization system 120 may be a computerized system which is a part of an information system configured to interact with the data provider 110 and the user 130. The user 130 may be a worker or a manager in a business organization, an external service consumer or the like. The user 130 may be a consumer of data stored in the data provider 110. In some exemplary embodiments, a plurality of users may access the data provider, either via the computerized optimization system, via other channels or directly. The plurality of users may, for example, include users 131 and 132.

In some exemplary embodiments, the computerized optimization system 120 may be an integral component of the data provider 110, together forming an information system. For example, the information system may be marketed comprising the computerized optimization system 120 built in the data provider 110.

The user 130 may access the computerized optimization system 120 for retrieval of data, comprised by a structure model, from the data provider 110. The user 130 may access the computerized optimization system 120 by utilizing the client layer 150. The computerized optimization system 120 may retrieve data for the user 130 from the data provider 110, based on a personalized structure model. The personalized structure model may be determined according to usage information associated with the user 130. The personalized structure model may be organized such that a relatively more efficient data retrieval may be performed. For example, several structure objects that may be obtained by a single query may be grouped together and retrieved by a single retrieval request instead of multiple requests. As another example, the personalized structure object may be a flat structure model. As yet another example, an order of retrieval of structure objects of the structure model may be modified to enable faster retrieval of data associated with predetermined structure objects, such as for example structure objects that the user 130 is often interested in.

The usage information may be obtained by the computerized optimization system 120 during previous uses of the user 130, may be provided to the computerized system 120 by another device or user, or otherwise be available to the computerized optimization system 120.

Retrieval of data from the data provider 110 may be a local retrieval or a remote retrieval. A local retrieval may be performed by using SQL, for example. A remote retrieval may be performed by using Web Service, REST, Remote Function Call (RFC), Remote Procedure Call (RPC) or the like.

The data retrieved from the data provider 110 may be presented or otherwise provided to the user 130 by the client layer 150. A connection between the computerized optimization system 120 and the client layer 150 may be enabled by protocols such as REST or SOAP, for example. The computerized optimization system 120 may update the personalized structure model in response to a use of the user 130, every use of the user 130, every predetermined time period, in predetermined times, in response to predetermined actions or the like.

The forms database 140 may comprise data regarding forms utilized by the user 130 when using the client layer 150. The forms database 140 may comprise, for example, structure objects which are displayed or otherwise presented by a form in the client layer 150. The forms database 140 may comprise information regarding associated forms, such as a list form listing objects of a similar entity, and a details form detailing additional information regarding an object selected in the list form. The computerized optimization system 120 may utilize the forms database 140 in order to determine usage information. For example, the user 130 may be utilizing a first form, and therefore may be deemed as interested in a first portion of the structure model. The user 131 may be, on the other hand, utilizing a second form, and therefore may be deemed as interested in a second portion of the structure model. By being informed of information regarding various forms the user 130 utilizes, usage information may be obtained.

Figure 2:
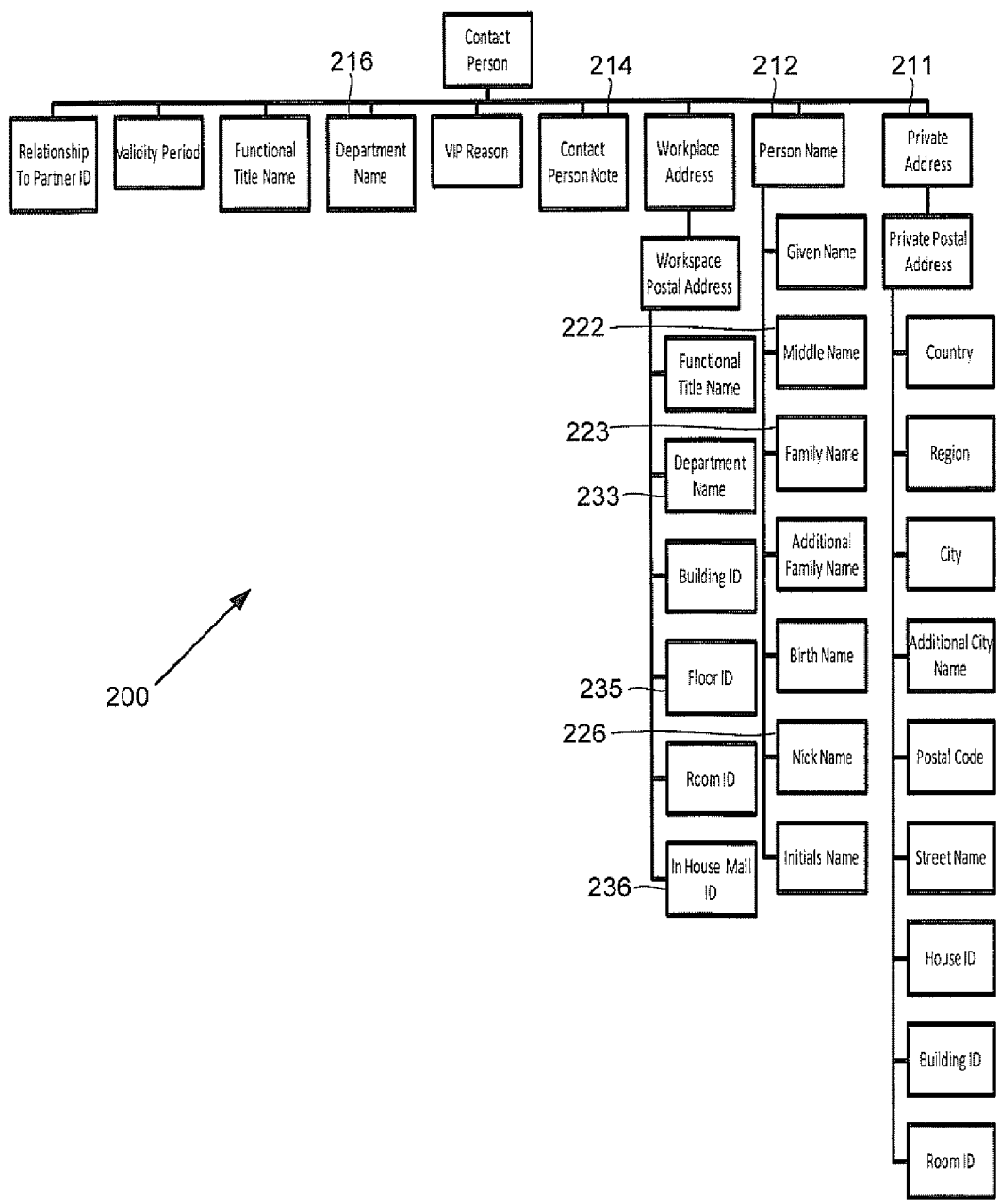
FIG. 2 shows a block diagram of a structure model, in accordance with some exemplary embodiments of the subject matter.

Referring now to FIG. 2 showing a block diagram of a structure model, in accordance with some exemplary embodiments of the subject matter. A structure model 200 may comprise structure objects such as sub-structures, second level sub-structures, third level sub-structures or the like. The structure model 200, presented in FIG. 2, is associated with a "Contact Person" entity. The structure model 200 may comprise sub-structures such as 211 named "Private Address", 212 named "Person Name", 214 named "Contact Person Note", 216 named "Department name" and the like. A sub-structure may comprise a second level sub-structures. For example, the sub-structure 212 may comprise second level sub-structures, such as 226 named "Nick Name", 222 named "Middle Name", 223 named "Family Name" and the like. The structure model 200 represents data that may be stored in a data provider, such as 110 of FIG. 1. A user, such as 130 of FIG. 1, may query for a portion of data associated to an entity, such as for example, data in structure objects 211, 212, 235 (named "Floor ID"), 236 (named "Room ID") or the like. It will be noted that in some exemplary embodiments, the structure model 200 may comprise two or more structure objects comprising identical information. For example, the structure objects 216 and 233 may comprise identical data—a department name of a contact person. As the data is identical for both structure objects 216 and 233, retrieving data from a single structure object, such as for example 216, may suffice. It will be noted that a structure of the structure model is generally referred to as a structure object.

Figure 3:
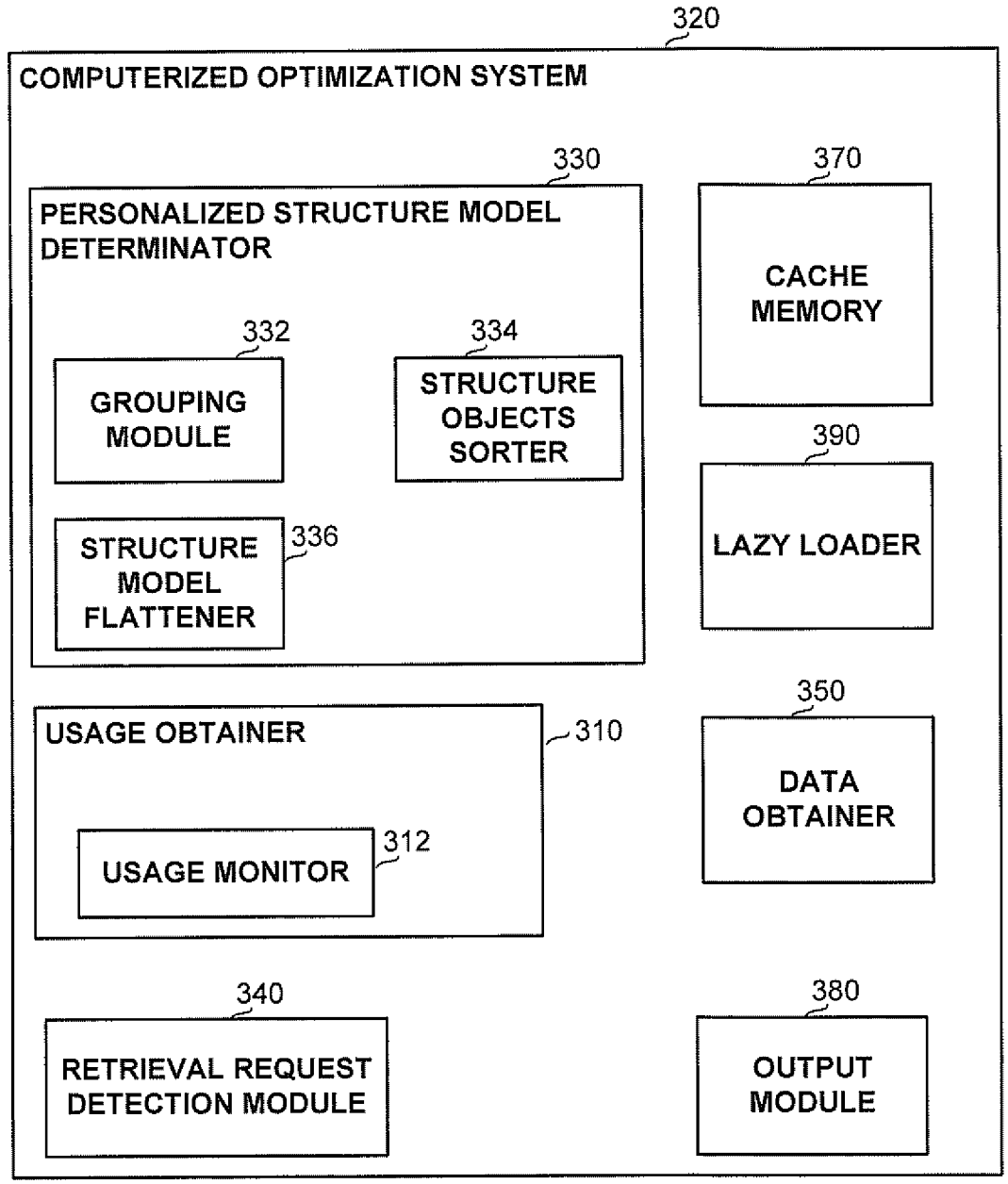
FIG. 3 shows a block diagram of a computerized optimization system, in accordance with some exemplary embodiments of the subject matter.

Referring now to FIG. 3 showing a block diagram of a computerized optimization system, in accordance with some exemplary embodiments of the subject matter. A computerized optimization system 320, such as 120 of FIG. 1, may comprise a usage obtainer 310, a personalized structure model determinator 330, a retrieval request detection module 340 and a data obtainer 350.

The usage obtainer 310 may be configured to obtain usage information of a user, such as the user 130 of FIG. 1. The usage information may be associated with a structure model, such as the structure model 200 of FIG. 2. In one exemplary embodiment, the usage obtainer may receive the usage information from the user, such as for example using a keyboard or other I/O device (not shown). In another exemplary embodiment, the usage obtainer 310 may comprise a usage monitor 312 configured to monitor user's usage in order to obtain the usage information. In yet another exemplary embodiment, the usage information may be obtained from a file, such as for example a log file.

In some exemplary embodiments, the personalized structure model determinator 330 may be configured to determine a personalized structure model for the user. The personalized structure model determinator 330 may utilize the usage obtainer 310 to determine the personalized structure model associated with a user based on the usage information. For example, a portion of the structure objects in the structure model may be removed from the personalized structure model. For example, rarely used structure objects may be removed, duplicate structure object may be replaced by a single structure object, or the like In some exemplary embodiments, the personalized structure model determinator 330 may comprise a grouping module 332. The grouping module 332 may be configured to determine a group of structure objects that may be retrieved in a single retrieval request from a data provider, such as the data provider 110 of FIG. 1. It will be noted that which structure objects may be retrieved in a single retrieval request may be dictated or otherwise determined by the data provider. It will be further noted that in some exemplary embodiments a group may be split to two or more groups based on usage information, such as for example not to include rarely used structure objects in a first group. The personalized structure model determinator 330 may utilize the grouping module 332 to determine the personalized structure model based on the group. For example, the personalized structure model may be configured to comprise structure objects from a limited number of groups, such as to reduce a number of retrieval requests to be required in order to retrieve data represented by the personalized structure model. A predetermined group may be preferred over another group based on the usage information. The personalized structure model determinator 330 may determine the personalized structure model such that it may include structure objects often utilized by the user and which can be retrieved by a relative small number of retrieval requests.

In some exemplary embodiments, the personalized structure model determinator 330 may comprise a structure objects sorter 334. The structure objects sorter 334 may be configured to determine an order of retrieval between a first structure object and a second structure object. The order of retrieval is based on the usage information. The order may affect an order of retrieval of the structure objects. In an exemplary embodiment, structure objects in the personalized structure model may be arranged from left to right, such that data associated with the structure objects is retrieved first for the leftmost structure object, through all the structure objects and to the rightmost structure object, which is retrieved last. In an exemplary embodiment, the structure objects sorter 334 may arrange structure objects from left to right, based on the usage information of the structure object, in a descending order. A structure object having a highest probability to be used by the user may be placed at the left side. A structure object having a lowest probability to be used may be placed at the right side. As a result, the computerized optimization system 320 retrieves the structure objects that are placed at the left side faster than the structure objects that are placed at the right side. It will be noted that an order may be determined between groups, between a structure object and a group of structure objects, or between any two elements of the personalized structure model that may retrieved each using a single retrieval request.

The structure objects sorter 334 may determine an order between second level sub-structures within a single sub-structure based on the usage information of the second level sub-structures. The personalized structure model determinator 330 may utilize the structure objects sorter 334 to determine an order of arrangement between structure objects of the personalized structure model.

In some exemplary embodiments, the personalized structure model determinator 330 may comprise a structure model flattener 336. The structure model flattener 336 may be configured to determine a flat personalized structure model. The structure model flattener 336 may determine a new arrangement of the structure objects by transforming second level sub-structures to sub-structures. The structure model flattener 336 may flatten the structure model by modifying the structure model to comprise only sub-structures. The structure model flattener 336 may determine a flat projection of a portion of the structure model, such as for example a projection of a second sub-structure to a set of sub-structures. The personalized structure model determinator 330 may utilize the structure model flattener 336 in order to determine a flat personalized structure model.

In some exemplary embodiments, the personalized structure model determinator 330 may utilize the grouping module 332, the structure objects sorter 334 and the structure model flattener 336, or a combination thereof, in order to determine the personalized structure model. For example, the structure objects sorter 334 may sort structure objects in an arrangement based on groups of the structure objects determined by the grouping module 332. The structure model flattener 336 may utilize the arrangement in order to determine the flat structure model.

In some exemplary embodiments, the personalized structure model determinator 330 may omit duplicate structure objects, such as department name 233 of FIG. 2.

The retrieval request detection module 340 may be configured to detect a retrieval request by the user. The retrieval request may be associated with the entity associated with the structure model. The retrieval request detection module 340 may utilize an interface, such as for example an Application Programming Interface (API), or another I/O module in order to detect the retrieval request by the user. In some exemplary embodiments, the user may send a retrieval request to the information system through the computerized optimization system 320 by employing a predetermined communication protocol. The retrieval request detection module 340 may implement the communication protocol.

The data obtainer 350 may be configured to obtain data associated with the retrieval request. The data obtainer 350 may be configured to obtain the data from the data provider based on the personalized structure model determined by the personalized structure model determinator 330. For example, in case the personalized structure model comprises less structure objects than the full structure model associated with the retrieval request, the data obtainer 350 may obtain only structure objects comprised by the personalized structure model. It will be noted that the data obtainer 350 may obtain data not required by the retrieval request, such as data associated with the personalized structure model and not requested by the retrieval request.

In some exemplary embodiments, the computerized optimization system 320 may further comprise a cache memory 370. The computerized optimization system 320 may utilize the cache memory 370 for storing the data obtained by the data obtainer 350 but not yet requested by the user. In case the user later requests to retrieve structure objects comprised by the personalized structure model, the computerized optimization system 320 may provide the structure objects stored in the cache memory 370 without requesting data from the data provider. Storing data associated with the personalized structure model in the cache memory 370 may consume less memory space than storing data associated with the structure model. Storing data associated with the personalized structure model may further reduce latency time until the user receives the data. As the personalized structure model may be determined based on the user's usage. the data stored in the cache memory 370 is likely to be of interest to the user, and therefore a relative small amount of redundant data may be retrieved from the data provider and stored in the cache memory 370.

In some exemplary embodiments the computerized optimization system 320 may further comprise an output module 380. The output module 380 may be configured to provide the data, obtained by the data obtainer 350, to a client layer such as the client layer 150 of FIG. 1. The output module 380 may provide data requested by the retrieval request detected by the retrieval request detection module 340.

In some exemplary embodiments, the computerized optimization system 320 may further comprise a lazy loader 390. The lazy loader 390 may be configured to lazy load additional data from the data provider. The additional data is associated with the structure model and is not associated with the personalized structure model determined by the personalized structure model determinator 330. In some exemplary embodiments, the lazy loader 390 may be configured to retrieve the additional data in response to a request by the user. For example, the request may be a retrieval request of a structure object not comprised by the personalized structure model. In some exemplary embodiment, the lazy loader 390 may be configured to retrieve additional data requested by the user and not previously stored in the cache memory 370. In some exemplary embodiment, the lazy loader 390 may be configured to obtain the additional data without being invoked by the user. For example, the lazy loader 390 may determine to obtain the additional data in case the data provider, the computerized optimization system 320, a combination thereof, or the like, is operating at a reduced performance such as during an idle status. In case a component is idle, obtaining the additional data may not hinder system performance as allocated resources for the retrieval of the additional data are not required for performing other tasks.

Figure 4:
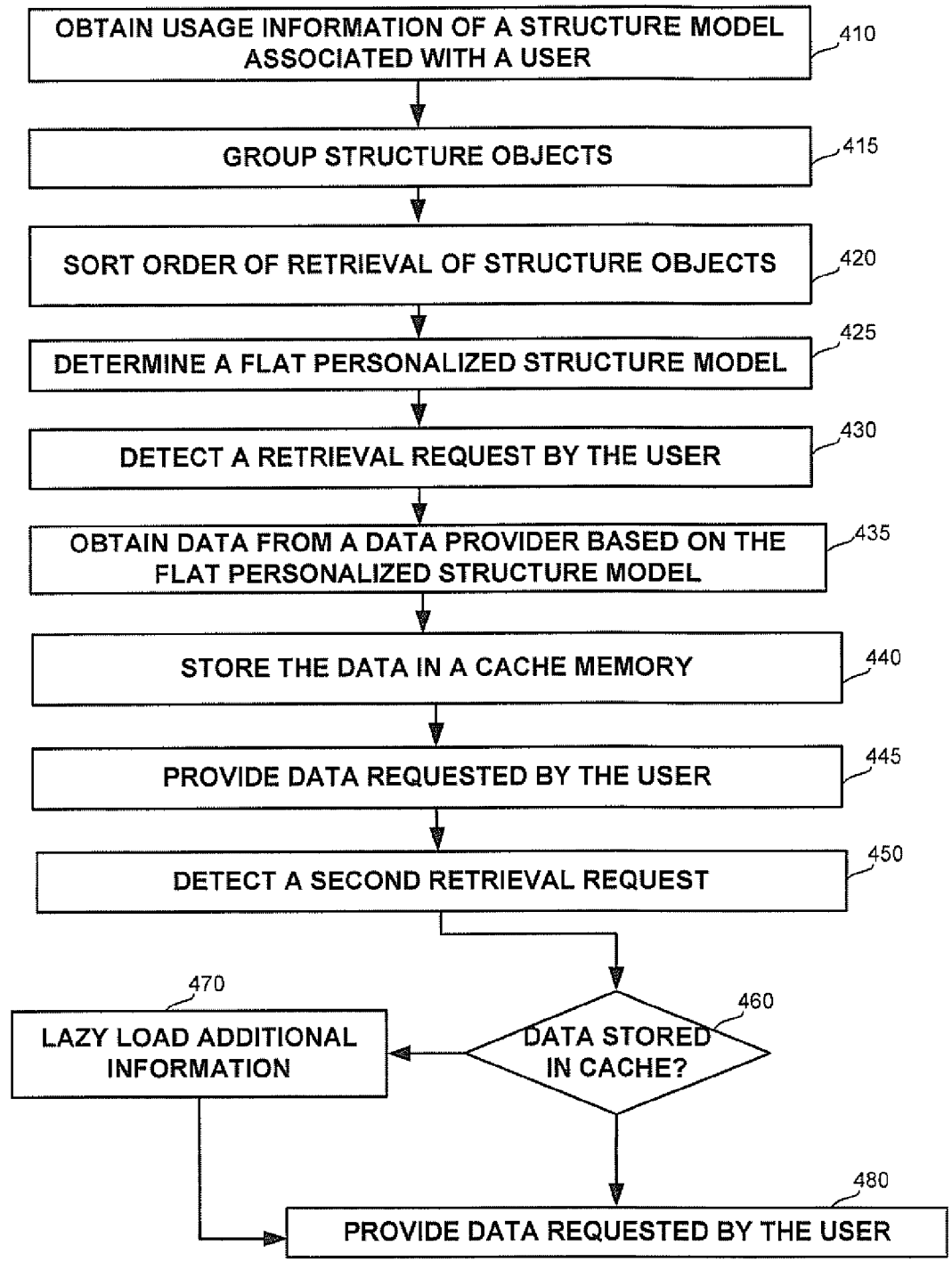
FIG. 4 shows a flow diagram of a method, in accordance with some exemplary embodiments of the disclosed subject matter.

Referring now to FIG. 4 showing a flow diagram of a method, in accordance with some exemplary embodiments of the disclosed subject matter.

In step 410, usage information of a structure model may be obtained. The usage information may be obtained by a usage obtainer, such as 310 of FIG. 3.

In step 415, structure objects may be grouped into one or more groups. The grouping may be performed by a grouping module, such as 332 of FIG. 3.

In step 420, order of retrieval between structure objects may be determined. In some exemplary embodiments, an order may be determined also between a group and a structure object not comprised by a group. In some exemplary embodiments, an order may be determined between groups. The order may be determined by a structure objects sorter, such as 334 of FIG. 3.

In step 425, a flat personalized structure model may be determined. The flat personalized structure model may be determined by a structure model flattener, such as 336 of FIG. 3.

In step 430, a retrieval request associated with an entity represented by the structure model may be detected. A retrieval request detection module, such as 340 of FIG. 3, may detect the retrieval request.

In step 435, data may be obtained from the data provider. The data may be associated with the flat personalized structure model determined in step 425. The data may be obtained by a data obtainer, such as 350 of FIG. 3.

In step 440, the data retrieved in step 435 may be stored in a cache memory, such as 370 of FIG. 3.

In step 445, data requested by the user in the retrieval request detected in step 430 may be provided to the user. The data may be provided by an output module, such as 380 of FIG. 3.

In step 450, a second retrieval request may be detected, such as for example by the retrieval request detection module. The second retrieval request may be also associated with the same entity as the retrieval request detect in step 430.

In step 460, a determination is made whether or not requested data in the second retrieval request is stored in the cache memory. In case the data is not stored, lazy loading of additional information may be performed in step 470, such as for example by a lazy loader 390 of FIG. 3. In case the data is previously stored in the cache, or in case the data was lazy loaded in step 470, the data may be provided to the user in step 480.

In some exemplary embodiments, data in the cache may be removed periodically, in predetermined times, upon predetermined triggers or the like. In some exemplary embodiments, lazy loading, such as performed in step 470 may be performed not in response to a retrieval request.

It will be noted that the user's retrieval requests, such as those detected in step 430 or step 450, may be monitored by a usage monitor such as 312 of FIG. 3, and later on used as the usage information.

It will be noted that the disclosed subject matter may be implemented in a middleware. The middleware may be configured to receive retrieval requests from the user and provide, in response, data. In such a scenario, detection of retrieval request such as for example performed in step 430 or by a retrieval request detection module 340, may be simply receiving the request via an API or the like.

Although the above mentioned was described regarding a single entity represented by the structure model, it will be noted that the disclosed subject matter may also be applied in a similar manner to several entities represented by the structure model, or to several entities represented by several structure models that are interconnected.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method in a computerized environment, the environment comprising a data provider on a computing platform having a structure model associated with an entity, said method comprising:
   obtaining usage information of the structure model, the usage information is associated with a user, wherein the usage information comprises retrieving data from the data provider using the structure model in response to a query by the user from a remote computing platform and wherein the structure model comprises structure objects including multiple levels of sub-structures;
   determining a personalized structure model based on the usage information, wherein determining the personalized structure model comprises:
      determining a group of the structure objects to retrieve from the data provider;
      determining an order of retrieval of the structure objects; and
      determining an arrangement of the structure objects by flattening the structure model;
   detecting a retrieval request by the user from the remote computing platform, the retrieval request is associated with retrieving data from the data provider in response to a query;
   retrieving data from the data provider based on the determined personalized structure model instead of the structure model; and
   providing the retrieved data to a client layer on the remote computing platform utilized by the user.

2. The method according to claim 1, wherein said retrieving data further comprises storing the data in a cache memory.

3. The method according to claim 1, wherein said obtaining usage information comprises receiving the usage information from at least one of a computerized optimization system during previous uses of the user, another device and another user.

4. The method according to claim 1, wherein said obtaining usage information comprises monitoring a first retrieval request by the user, the first retrieval request is associated with the structure model.

5. The method according to claim 4, wherein said monitoring the first retrieval request by the user comprises associating the first retrieval request with a form based on an association between the first retrieval request and a portion of the structure model.

6. The method according to claim 1, wherein determining the group of structure objects comprises retrieving the structure objects in a single retrieval request from the data provider, the structure objects are comprised by the structure model.

7. The method according to claim 1, wherein said determining the order comprises order of retrieval between a first structure object and a second structure object, the order of retrieval is based on the usage information.

8. The method according to claim 1, wherein flattening the structure model comprises determining a flat personalized structure model in which the objects of the flat personalized structure model are arranged so that the flat personalized structure model includes sub-structures and not sub-structures of sub-structures.

9. The method according to claim 8 further comprises lazy loading of additional data from the data provider, the additional data is associated with the structure model, the additional data is not comprised by the personalized structure model.

10. The method according to claim 9, wherein the additional data comprising a first structure object and a second structure object, and wherein said lazy loading comprises: determining an order of retrieval between the first structure object and the second structure object, the order of retrieval is based on the usage information; and retrieving the first structure object and the second structure object based on the order of retrieval.

11. The method according to claim 1, wherein the data provider is controlled by a third party.

12. The method according to claim 1, wherein the data provider comprising a first data source and a second data source.

13. A computerized optimization system associated with a data provider on a computing platform, the data provider having a structure model associated with an entity, said computerized optimization system comprising:
- a usage obtainer configured to obtain usage information of the structure model, the usage information is associated with a user accessing the data provider computing platform from a remote computing platform, wherein the usage information comprises retrieving data from the data provider using the structure model in response to a query by the user from the remote computing platform and wherein the structure model comprises structure objects including multiple levels of sub-structures;
- a personalized structure model determinator configured to determine a personalized structure model associated with the entity based on the usage information obtained by said usage obtainer, wherein the personalized structure model determinator comprises:
  - a grouping module to determine a group of the structure objects to retrieve from the data provider;
  - a structure objects sorter to determine an order of retrieval of the structure objects; and
  - a structure model flattener to determine an arrangement of the structure objects by flattening the structure model;
- a retrieval request detection module configured to detect a retrieval request by the user and accept the retrieval request using the personalized structure model at the remote computing platform, the retrieval request is associated with the entity; and
- a data obtainer configured to obtain data associated with the retrieval request, the data obtainer is configured to obtain the data from the data provider at the computing platform based on the personalized structure model instead of the structure model.

14. The computerized optimization system according to claim 13 further comprising an output module configured to provide the data to a client layer utilized by the user.

15. The computerized optimization system according to claim 13 further comprising a cache memory.

16. The computerized optimization system according to claim 13, wherein said usage obtainer comprises a usage monitor.

17. The computerized optimization system according to claim 13, wherein the grouping module is configured to determine the group of structure objects that can be retrieved in a single retrieval request from the data provider, the structure objects are comprised by the structure model; and wherein the personalized structure model determinator is configured to determine the personalized structure model based on the group.

18. The computerized optimization system according to claim 13, wherein the structure objects sorter is configured to determine the order of retrieval between a first structure object and a second structure object, the order of retrieval is based on the usage information.

19. The computerized optimization system according to claim 13, wherein the structure model flattener is configured to determine a flat personalized structure model in which the objects of the flat personalized structure model are arranged so that the flat personalized structure model includes sub-structures and not sub-structures of sub-structures.

20. The computerized optimization system according to claim 13 further comprising a lazy loader configured to lazy load additional data from the data provider, the additional data is associated with the structure model, the additional data is not comprised by the personalized structure model.

21. The computerized optimization system according to claim 13, wherein said usage obtainer is configured to utilize a design of a form associated with the entity.

22. The computerized optimization system according to claim 13 further comprising the data provider.

* * * * *